United States Patent
Mull, Jr.

(10) Patent No.: US 9,903,266 B2
(45) Date of Patent: Feb. 27, 2018

(54) FLOW CHANNELING AIR INTAKE MIXING DEVICE FOR INTERNAL COMBUSTION ENGINE

(71) Applicant: Ford Global Technologies, LLC, Dearborn, MI (US)

(72) Inventor: Ted Vincent Mull, Jr., Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 14/017,923

(22) Filed: Sep. 4, 2013

(65) Prior Publication Data

US 2015/0059689 A1    Mar. 5, 2015

(51) Int. Cl.
*F02B 31/00*    (2006.01)
*F02B 31/04*    (2006.01)
*F02B 31/06*    (2006.01)

(52) U.S. Cl.
CPC .............. *F02B 31/04* (2013.01); *F02B 31/06* (2013.01); *Y02T 10/146* (2013.01)

(58) Field of Classification Search
CPC .......... F02B 31/06; F02B 31/04; F02B 31/00; F02B 31/08; Y02T 10/146; F16K 47/08; F16K 31/26; F16K 1/22; F16K 3/04; F16K 3/06; F16K 51/02; A62C 35/68; B01F 5/064; G01N 1/38
USPC .......................... 123/306, 308; 251/118, 302
See application file for complete search history.

(56) References Cited

U.S. PATENT DOCUMENTS

| | | | |
|---|---|---|---|
| 5,477,823 A | 12/1995 | Uchida | |
| 5,640,941 A | 6/1997 | Hazen et al. | |
| 5,718,198 A | 2/1998 | Adamisin et al. | |
| 6,006,721 A | 12/1999 | Shannon et al. | |
| 6,092,503 A * | 7/2000 | Ohsuga | F02B 27/0252 123/184.31 |
| 6,394,066 B1 | 5/2002 | Chou et al. | |
| 6,553,961 B2 | 4/2003 | Hammoud et al. | |
| 6,712,038 B2 | 3/2004 | Hiraku et al. | |
| 6,874,465 B2 | 4/2005 | Arimatsu et al. | |
| 7,938,099 B2 * | 5/2011 | Abe | F02B 31/06 123/306 |
| 8,430,074 B2 | 4/2013 | McCarthy et al. | |
| 2008/0078356 A1 * | 4/2008 | Akagawa | F02B 31/06 123/403 |

(Continued)

*Primary Examiner* — Lindsay Low
*Assistant Examiner* — Omar Morales
(74) *Attorney, Agent, or Firm* — LeClairRyan

(57) ABSTRACT

A system for targeting an air-fuel mixture flow pattern within the intake port of an internal combustion engine is provided. The system includes a flow pattern control plate movably provided within the intake port. The plate includes at least one air-fuel mixture funneling opening. The opening is rounded and is preferably ovoid. Preferably there are two openings with one opening being larger than the other. The upstream side of the plate includes a sloped surface formed from its edge toward the openings, thus funneling the air-fuel mixture passing from the upstream side, through the plate, and to the downstream side. The size, shape and number of openings can be selectively adjusted thus making the system tunable. The intake port includes a sloped portion formed on its inner surface adjacent the flow pattern control plate to funnel the flow of the air-fuel mixture through the at least one plate opening.

15 Claims, 5 Drawing Sheets

(56) References Cited

U.S. PATENT DOCUMENTS

2009/0120400 A1* 5/2009 Abe ................... F02B 31/06
123/184.56
2010/0037846 A1* 2/2010 Kobori ............... F02B 31/06
123/184.56

* cited by examiner

FLOW CHANNELING AIR INTAKE MIXING DEVICE FOR INTERNAL COMBUSTION ENGINE

TECHNICAL FIELD

The disclosed inventive concept relates to methods and systems to improve in-cylinder air and fuel mixing in an internal combustion engine. More particularly, the disclosed inventive concept relates to a flow channeling air intake charge motion and mixing device that improves in-cylinder air and fuel mixing in an internal combustion engine at low speed operation.

BACKGROUND OF THE INVENTION

The internal combustion engine delivers power that is generally limited by the rate at which the fuel-air mixture can enter the combustion chamber and by the rate at which the exhaust products can be removed from the combustion chamber. Complicating this fairly simple equation is the fact that power demands, and thus intake and exhaust characteristics, differ between low speeds and high speeds.

Further complicating this equation is the fact that both good fuel economy and reduced emissions must be achieved. To this end designers and manufacturers of automotive vehicles have the common goal of developing and producing engine and combustion systems that improve fuel economy while also reducing undesirable system emissions. A variety of systems have been developed that achieve these ends to one extent or another. Such systems include modified combustion chamber configurations, finely-tuned amounts of fuel and air supplied to the combustion chamber, and intake and exhaust mechanisms that create desired tumble or swirl patters of the air-fuel mixture as it enters the combustion chamber.

With respect to demands for lower emissions and higher fuel economy on gasoline spark ignition engines, research has shown that accomplishing these goals often requires the use of active systems within the engine's air supply primary runners. These systems, which frequently include a rotatable valve located at a strategic point in the air intake duct, partially block the flow passage during light engine speeds and loads and open, eliminating the blockage as engine speed and load increase. The rotatable valve in such a design is thus located at a point where airflow is affected by low engine load and speed. By partially blocking the flow path air velocities and turbulence increase providing improved fuel and air mixing, combustion burn characteristics, and an overall improvement in fuel economy. An important factor in the generation of turbulence (and the consequent enhancement of burn rate in engines) is charge motion in the combustion chamber.

The size and shape of the flow blockage device is engine design dependent. It is ordinarily of a simple rectangular shape provided to block part of the flow pattern as it enters the cylinder. The intended result is to impart a swirling flow, a tumble flow, or a combination of these two flow patterns within the engine cylinder. However, these simple rectangular shapes are often incapable of delivering sufficient flow modification to provide the desired improvement in engine operation. The design is further complicated by the desire to be flow neutral when retracted at higher engine speeds and loads.

As in so many areas of vehicle technology there is always room for improvement related to optimizing the use of fuel in internal combustion engines.

SUMMARY OF THE INVENTION

The disclosed inventive concept overcomes the problems associated with known systems for optimizing the use of fuel in an internal combustion engine. Particularly, the disclosed inventive concept provides a more targeted flow pattern that is capable of increasing fuel efficiencies at all engine speeds over known systems.

The disclosed inventive concept provides a system for an internal combustion engine that includes a flow pattern control plate movably provided within the intake port associated with the cylinder head of the internal combustion engine. The flow pattern control plate includes a first side and a second side. One or more air-fuel mixture funneling openings are formed between the first and second sides. The openings are rounded and are preferably ovoid in shape. Preferably but not absolutely one of the openings is larger than the other.

The flow pattern control plate has a first side and a second side. The first side has a peripheral surface. A portion of the first side is sloped from the peripheral surface toward the air-fuel mixture funneling openings, thus funneling the air-fuel mixture passing from the upstream end of the intake port through the plate to the downstream end of the intake port and into the combustion chamber. The size, shape and number of the air-fuel mixture funneling openings can be selectively adjusted thus making the system of the disclosed inventive concept highly tunable.

The intake port includes a combustion chamber attachment end and a plenum. The flow pattern control plate is provided within the intake port between the attachment end and the plenum. Preferably the intake port includes a sloped portion formed on its inner surface adjacent the flow pattern control plate to funnel the flow of the air-fuel mixture to and through the openings formed in the plate.

Movably positioned within the intake port, the flow pattern control plate is movable between a first position in which the plate is substantially perpendicular to the long axis of the intake port and a second position in which the plate is substantially parallel to the long axis of the intake port. The plate is in the first position during low engine speed operation and is in the second position during high speed engine operation.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
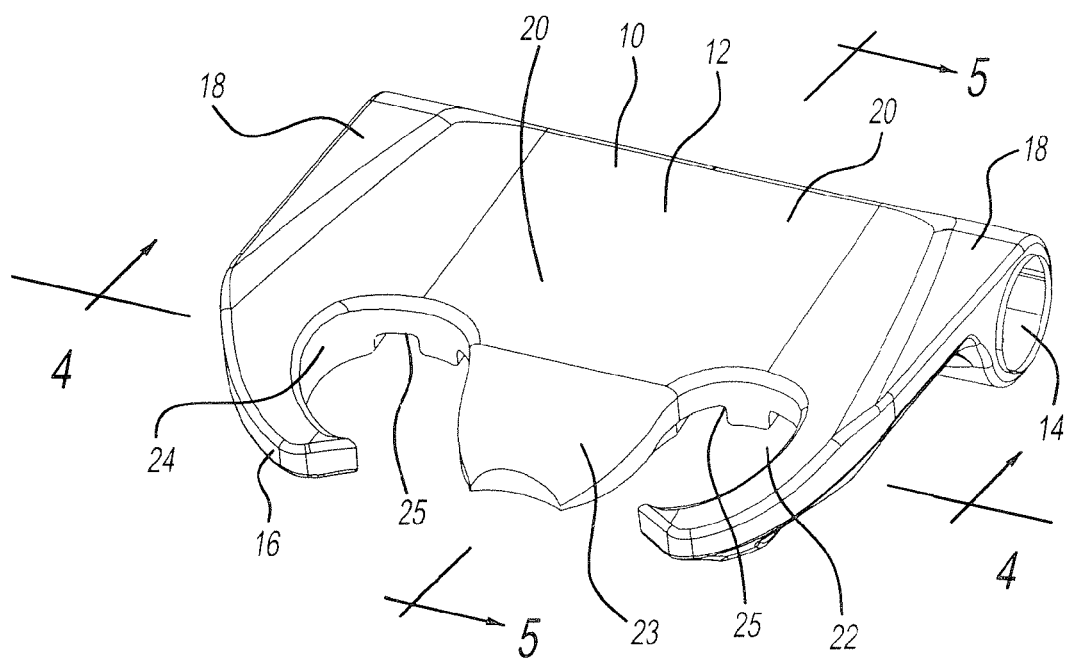
FIG. 1 illustrates a perspective view of the flow pattern control plate according to the disclosed inventive concept as viewed from the plate's upstream side.
Figure 2:
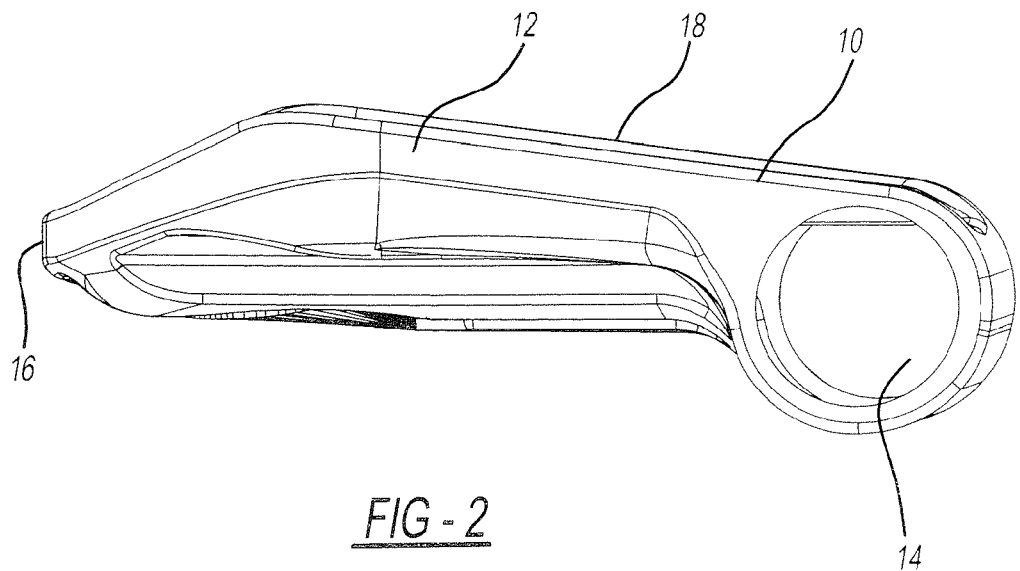
FIG. 2 illustrates a side view of the flow pattern control plate shown in FIG. 1.
Figure 3:
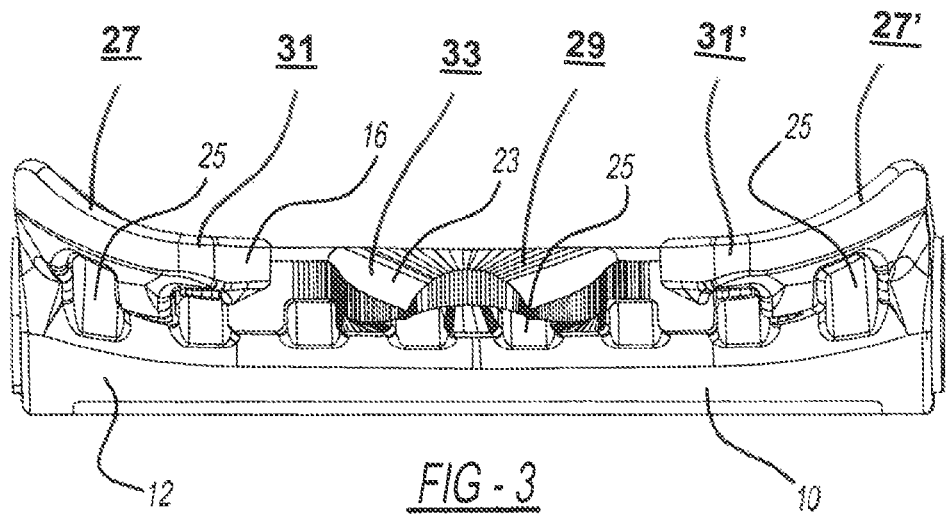
FIG. 3 illustrates a front view of the flow pattern control plate shown in FIG. 1.
Figure 4:
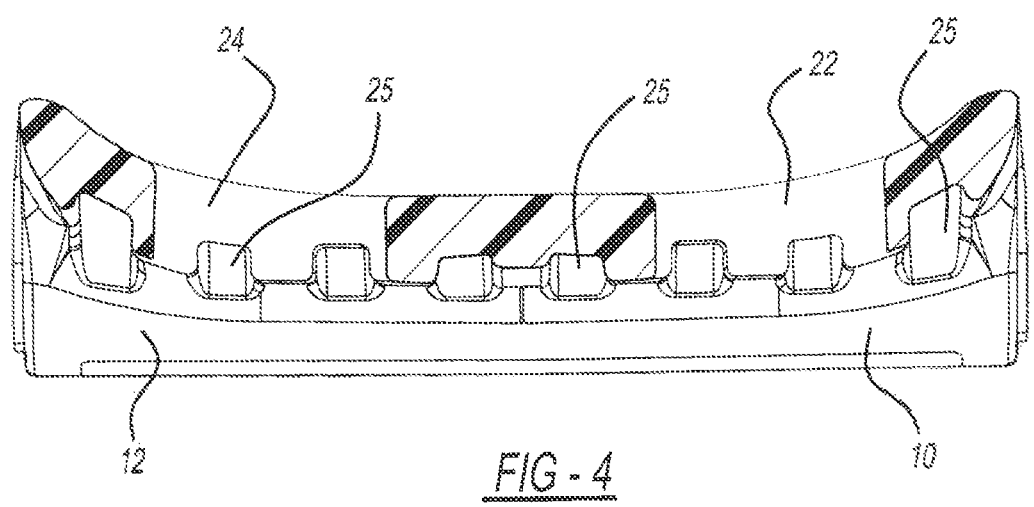
FIG. 4 illustrates a sectional view of the flow pattern control plate according to the disclosed inventive concept taken along line 4-4 of FIG. 1.
Figure 5:
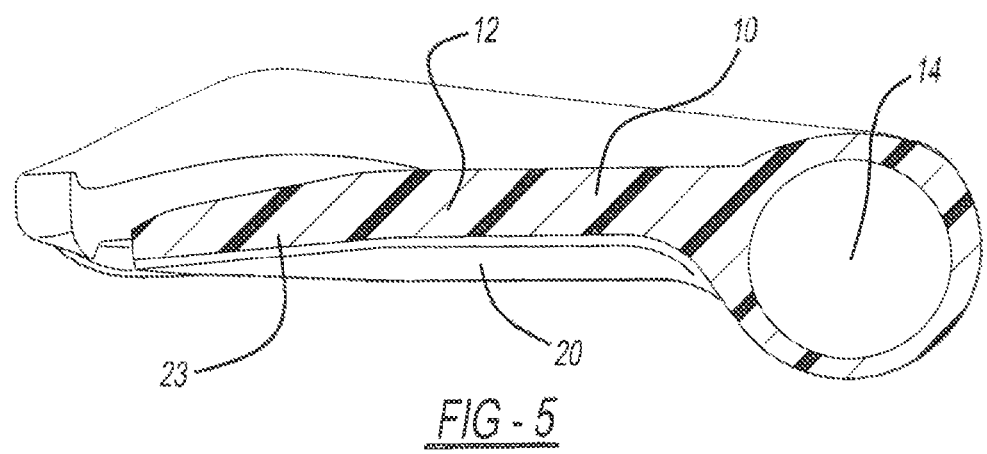
FIG. 5 illustrates a sectional view of the flow pattern control plate according to the disclosed inventive concept taken along line 5-5 of FIG. 1.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides a system that introduces a targeted flow pattern of the air-fuel mixture. The disclosed inventive concept meets engine system functional requirements. The air-fuel mixture flow pattern is targeted toward a specific region of the intake port. Thus the system is capable of delivering an in-cylinder flow pattern that improves combustion efficiencies and thus improves fuel economy.

The system includes a flow pattern control plate having a pair of air-fuel mixture-passing openings that is usable in combination with an intake port having a sloped interior surface adjacent the plate. The geometry of these elements contributes to the funneling of the air-fuel mixture toward the center of the intake port bore delivering improved tumble motion. By changing the size of the openings, the in-cylinder swirl motion of the air-fuel mixture can be added and may be tuned to adjust the amount of swirl by biasing the size of the plate openings for split port applications.

Particularly, and referring to FIGS. 1-5, a movable flow pattern control plate 10 is provided. The movable flow pattern control plate 10 includes a body 12. The movable flow pattern control plate 10 may be composed of a variety of materials including, for example, aluminum or aluminum alloy or a molded composite plastic.

The body 12 of the movable flow pattern control plate 10 includes a pivoting intake port attachment end 14 and a funneling end 16. The outer or upstream side of the body 12 includes a peripheral surface 18 and a central area 20. This configuration is most clearly seen in FIGS. 3 and 4. This surface of the body 12 slopes downwardly from the peripheral surface 18 toward the central area 20 and to the funneling end 16 such that the thickness of the body 12 is greater at the peripheral surface 18 than at the funneling end 16. Accordingly, the slope on the outer side of the body 12 runs from the peripheral surface 18 inward and downward toward the funneling end 16. A first opening 22 and a second opening 24 are formed in the funneling end 16 of the body 12 by a pair of spaced apart arms 27 and 27' and an intermediate nosepiece 29. The arm 27 has a leading end 31, the arm 27' has a leading end 31', and the nosepiece has a leading end 33. As illustrated particularly in FIG. 3, the thicknesses of the leading ends 31 and 31' are greater than the thickness of the leading end 33. The openings 22 and 24 are discussed in detail below in relation to FIGS. 7 and 8. A nose ramp 23 is formed between the openings 22 and 24.

Figure 6:
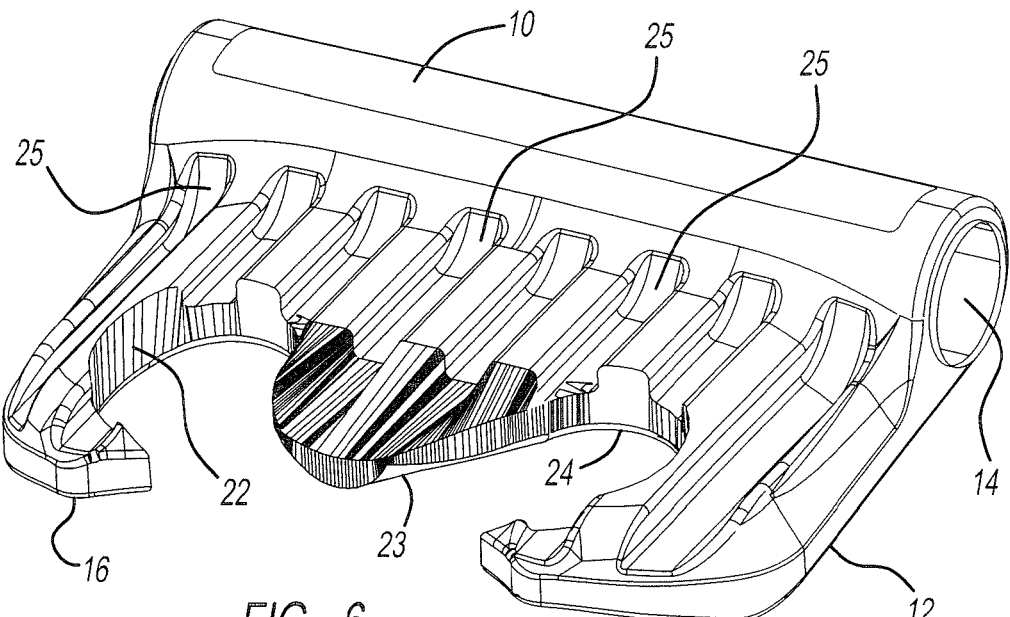
FIG. 6 illustrates a perspective view of the flow pattern control plate according to the disclosed inventive concept as viewed from the plate's downstream side.

FIG. 6 illustrates a perspective view of the movable flow pattern control plate 10 taken from its downstream side. A series of channels 25 are formed therein. The channels 25 reduce overall weight of the movable flow pattern control plate 10 while maintaining good structural integrity.

Figure 7:
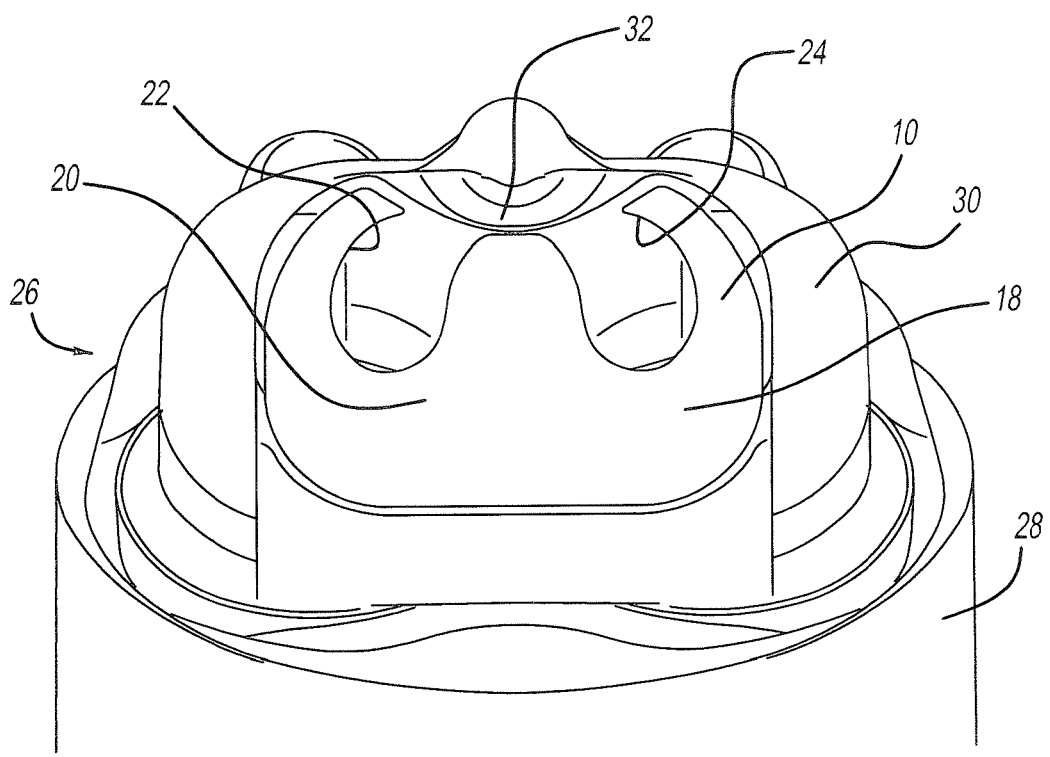
FIG. 7 illustrates a perspective view of the flow pattern control plate in its operational position within a section of an intake port according to the disclosed inventive concept.

Referring to FIG. 7, the movable flow pattern control plate 10 is movably provided as part of an assembly 26 that includes an intake port 28 and a plate support structure 30. The plate support structure 30 is provided integrally with the intake port 28 as is known in the art. The movable flow control plate 10 is in its low-speed position as shown in FIG. 7. In its high-speed position the movable control plate 10 is pivotably moved at its attachment end 14 in the downstream direction of the intake port 28 such that it is no longer in the stream of flow of the air-fuel mixture. The movement of the movable flow pattern control plate 10 is more clearly illustrated in FIG. 10 and is discussed below in relation thereto.

Still referring to FIG. 7, an injector pocket 32 for receiving a fuel injector (not shown) is formed on the inner surface of the intake port 28. The injector pocket 32 is shown in a sectional view and is also more clearly illustrated in FIG. 10. As shown in FIG. 7, a portion of the injector pocket 32 generally nests with the funneling end 16 of the movable flow pattern control plate 10. The sloped surface of the injector pocket 32 assists in funneling the air-fuel mixture toward the openings 22 and 24 and thus its surface can be shaped as required to optimize flow efficiency.

Figure 8:
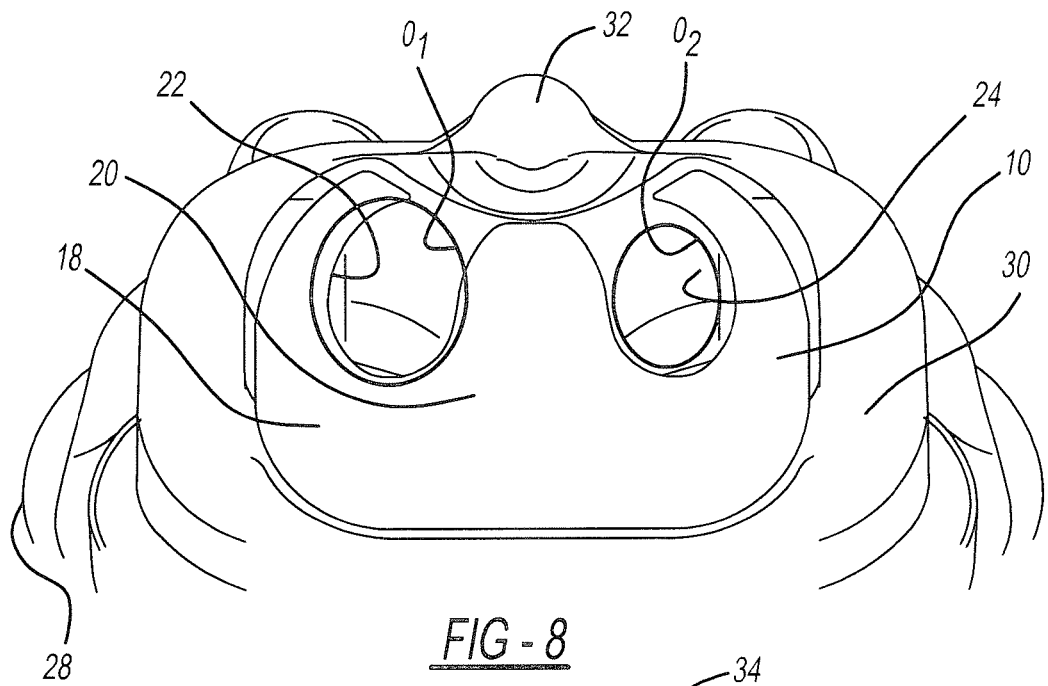
FIG. 8 is a view similar to that of FIG. 7 but highlighting the shapes of the openings formed in the flow pattern control plate.

As noted above, the disclosed inventive concept allows for the tuning of the tumble and swirl of the air-fuel mixture flow. In addition to adjusting the degree of slope of the injector pocket 32, the size of the openings 22 and 24 may be adjusted. Specifically, and with reference to FIG. 8, the opening 22 is of a first size opening $0_1$ while the opening 24 is of a second size opening $0_2$. As shown in FIG. 8, the diagrammatic illustrations of $0_1$ and $0_2$ show the size of the former as being greater than the latter. The sizes of the openings 22 and 24 shown in FIG. 8 are for illustrative purposes only and are not intended as being limiting, as other sizes may be suitable for tuning purposes.

The openings 22 and 24 may be the same size or may be different sizes. As illustrated in FIGS. 7 and 8, the size $0_1$ of the opening 22 is larger than the size $0_2$ of the opening 24. The sizes of the openings 22 and 24 may be varied to tune the amount of swirl and tumble that is delivered to the combustion chamber. As the size differences of the two openings increase, the amount of swirl increases. Conversely, if the openings are the same size then the mixture experiences mostly tumble and little if any swirl. Thus by changing the sizes of the openings 22 and 24 the air-fuel flow can be adjusted for proper targeting of the flow toward the center of the intake port bore.

Figure 9:
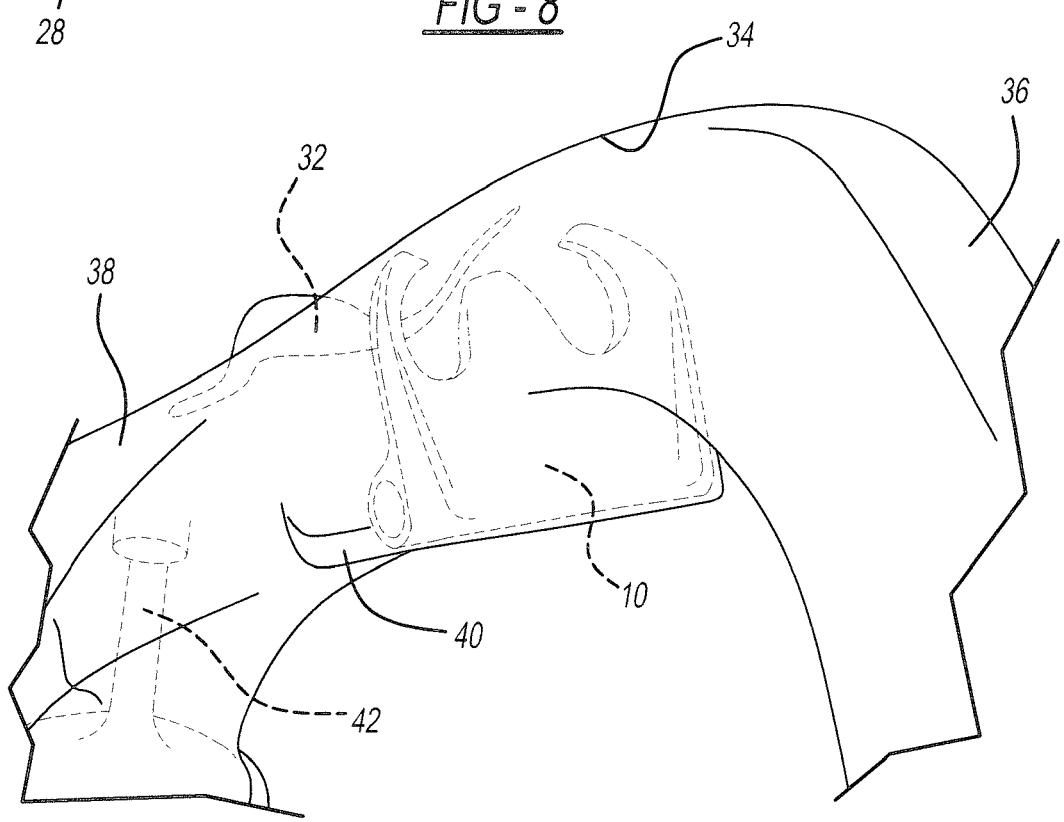
FIG. 9 is a perspective view of the intake port according to the disclosed inventive concept illustrating the flow pattern control plate in its operational position.
Figure 10:
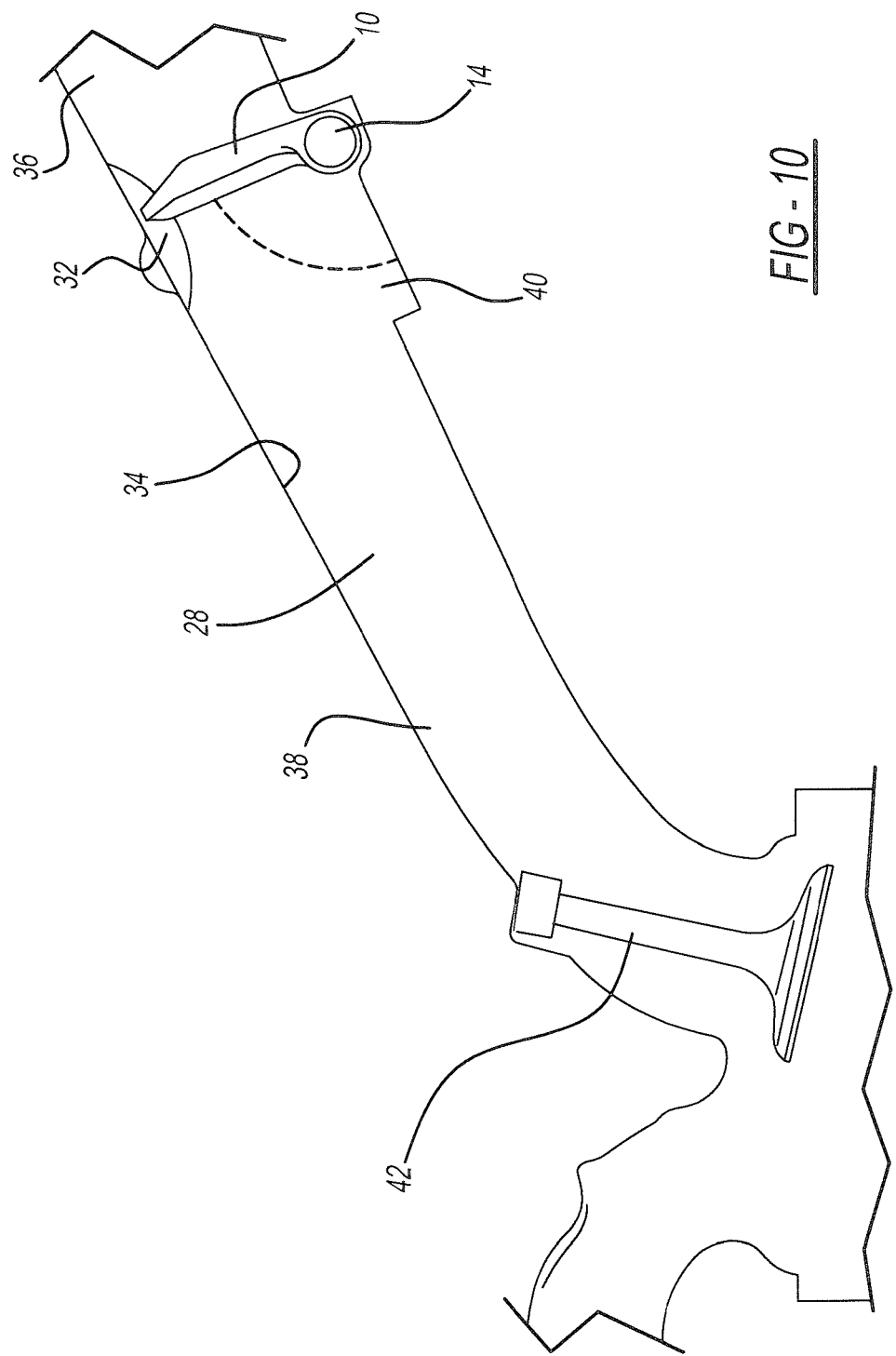
FIG. 10 is a sectioned side view of the intake port according to the disclosed inventive concept illustrating the flow pattern control plate in its operational position.

FIGS. 9 and 10 illustrate the disposition of the movable flow pattern control plate 10 within the intake port 28. As shown in these figures, the intake port 28 includes an inner surface 34 upon which the injector pocket 32 is formed. FIGS. 9 and 10 also illustrate a plenum 36 formed at the upstream end of the intake port 28 and a combustion chamber attachment end 38 formed at the downstream end of the intake port 28. A recessed area 40 is provided to receive the movable flow pattern control plate 10 when moved to its high-speed position. The combustion chamber attachment end 38 is attached to the combustion chamber in which an intake valve 42 is disposed.

As illustrated in FIGS. 9 and 10, the movable flow pattern control plate 10 is shown moved to its low-speed position in which the incoming air-fuel mixture is funneled as it passes through the openings 22 and 24. When engine speed increases, the movable flow pattern control plate 10 is rotatably moved along the direction of the broken line to its lowered position by a plate driver (not shown) to rest in the recessed area 40. Thus positioned the movable flow pattern control plate 10 is no longer in the path of the air-flow mixture.

The disclosed invention as set forth above overcomes the challenges faced by known flow channeling air intake mixing devices. However, one skilled in the art will readily recognize from such discussion, and from the accompanying drawings and claims, that various changes, modifications and variations can be made therein without departing from the true spirit and fair scope of the invention as defined by the following claims.

What is claimed is:

1. An internal combustion engine comprising:
a cylinder head;
an intake valve mounted in said cylinder head;
an intake port associated with said cylinder head; and
a flow pattern control plate movably provided within said port, said plate having a pivoting end pivotably attached to said intake port, an air-fuel mixture funneling end having an opening opposite said pivoting end, and first and second sides, a slope being formed from said pivoting end to said funneling end, and a slope being formed between said sides, said flow pattern control plate having two air-fuel mixture funneling openings formed therein defined by two side arms each of which has a leading end and an intermediate nosepiece having a leading end, said leading end of each of said arms having a first thickness and said leading end of said nosepiece having a second thickness, said first thickness being greater than said second thickness.

2. The internal combustion engine of claim 1, wherein said openings each have a shape and wherein said shape is ovoid.

3. The internal combustion engine of claim 1, wherein one of said openings is larger than the other of said openings.

4. The internal combustion engine of claim 1, wherein said openings are the same size.

5. The internal combustion engine of claim 1, wherein said intake port includes a combustion chamber attachment end and a plenum, said flow pattern control plate being provided within said intake port between said attachment end and said plenum.

6. The internal combustion engine of claim 5, wherein said intake port includes an inner surface and where a sloped portion is formed on said inner surface adjacent said flow pattern control plate.

7. The internal combustion engine of claim 6, wherein said flow pattern control plate includes an indented area to accommodate said sloped portion of said inner surface.

8. The internal combustion engine of claim 6, in which said intake port has a long axis and said flow pattern control plate is movable between a first position in which said plate is substantially perpendicular to said long axis of said intake port and a second position in which said plate is substantially parallel to said long axis of said intake port.

9. The internal combustion engine of claim 8, in which said intake port includes a recessed area to accommodate said plate when in said second position.

10. A flow pattern control plate for use with an engine of the type including an air intake port which communicates with a cylinder in an internal combustion engine, the plate comprising:
a body having a pivoting end, a first side and a second side;
rounded first and second air-fuel mixture funneling openings formed through said body between said sides and opposite said pivoting end, said openings being defined by two side arms each of which has a leading end and an intermediate nosepiece having a leading end, said leading end of each of said arms having a first thickness and said leading end of said intermediate nosepiece having a second thickness, said first thickness being greater than said second thickness; and
a sloping surfaced defined between said first and second sides.

11. The flow pattern control plate of claim 10, wherein said openings have a shape and wherein said shape is ovoid.

12. The flow pattern control plate of claim 10, wherein one of said openings is larger than the other of said openings.

13. The internal combustion engine of claim 10, wherein said openings are the same size.

14. A method of controlling the flow pattern of an air-fuel mixture entering an internal combustion engine from an intake port between changes in low to high engine speeds, the method comprising the steps of:
positioning a flow pattern control plate within the intake port, said plate having a pivoting end, an air-fuel mixture funneling opening opposite said pivoting end, first and second sides having a sloping surface formed therebetween and two air-fuel mixture funneling openings formed therein defined by two side arms and an intermediate nosepiece, each of said two side arms having a leading end and said nosepiece having a leading end, said leading end of each of said arms having a first thickness and said leading end of said intermediate nosepiece having a second thickness, said first thickness being greater than said second thickness; and
moving said plate to a funneling position during low engine speed and to a non-funneling position during high engine speed.

15. The method of controlling the flow pattern of an air-fuel mixture of claim 14, wherein said openings are selected from the group consisting of different sizes or the same size.

* * * * *